Jan. 23, 1968　　　H. C. MOUWEN　　　3,364,897
DIFFERENTIAL FLUID PRESSURE INDICATOR
Filed Sept. 25, 1964
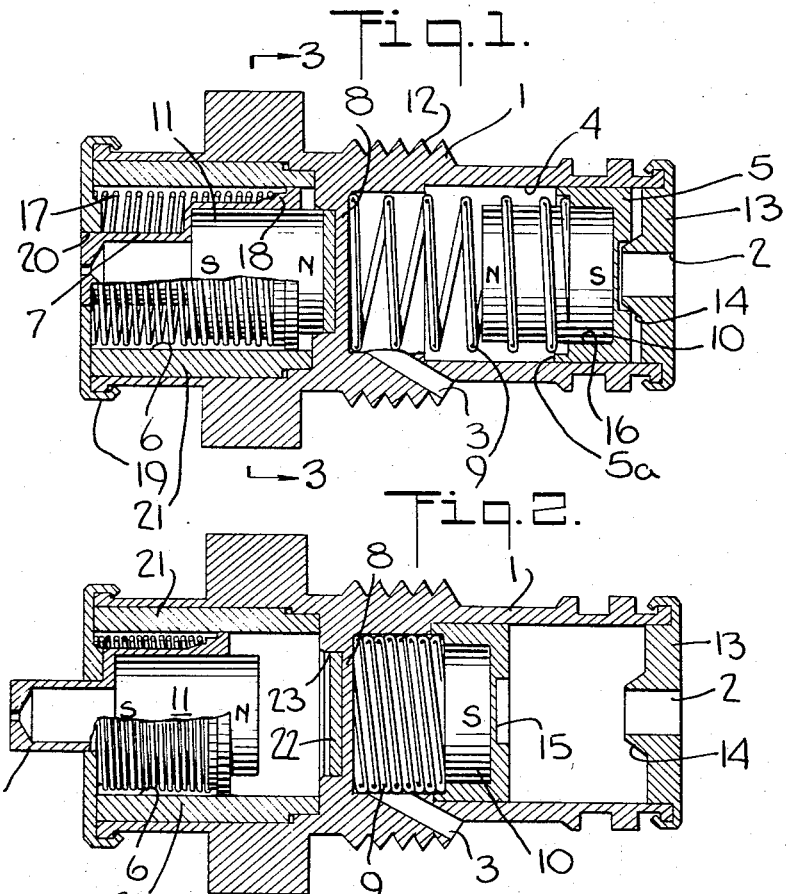
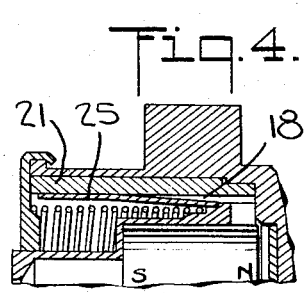
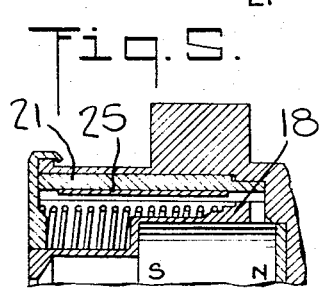
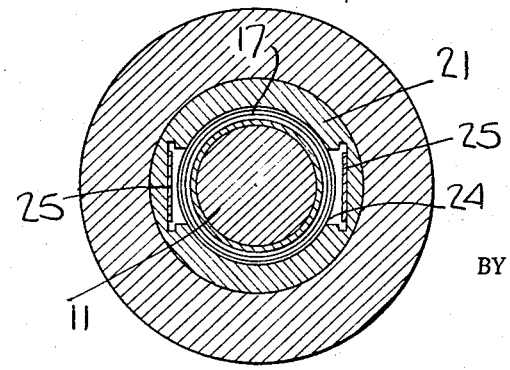
INVENTOR.
HERMAN C. MOUWEN
BY
Kenyon & Kenyon
ATTORNEYS United States Patent Office 3,364,897
Patented Jan. 23, 1968

3,364,897
DIFFERENTIAL FLUID PRESSURE INDICATOR
Herman C. Mouwen, Burbank, Calif., assignor to Purolator Products, Inc., Rahway, N.J., a corporation of Delaware
Filed Sept. 25, 1964, Ser. No. 399,250
3 Claims. (Cl. 116—70)

This invention relates to differential fluid pressure indicators. It is concerned particularly with the type adapted to be screwed or built into the housing of a fluid flow filter so that when the filtering element within the filter resists flow to a degree causing the pressure on its upstream side relative to its pressure on its downstream side to become undesirably higher, an external signal element operates to show that this condition exists.

Traditionally, such a pressure differential indicator includes a pressure differential piston having its opposite sides connected to the higher pressure on the upstream side of the filtering element and to the lower pressure on the downstream side of this element, respectively. A spring biases the piston against movement under normal conditions by the higher pressure of the upstream fluid. When this pressure, relative to that on the downstream side becomes excessive, the piston moves. It is necessary to use this motion to operate the signal element. This must be a device that can be seen or felt or used to actuate an electric switch or the like.

For certain applications, such as for aircraft hydraulic liquid filter installations, such an indicator must be made so that there is no possibility at all for leakage of the liquid inside the filter and which must operate the differential piston, to the outside of the filter, as by leakage through the signal actuating parts. In addition, it is important that the signal element not operate inadvertently due to vibration or shock, and that it operate positively and with certainty when the differential pressure piston is operated by an excessively high pressure differential. Once operated, it is equally important that the signal element remain in its signaling operation even though the flow of fuel through the filter stops so that the excessively high pressure differential initially detected no longer exists.

A very old way to transmit motion without the possibility of fluid leakage is to do so by means of magnetic force working through a wall confining the fluid. The prior art includes examples of such arrangements. One object of the present invention is to use this magnetic principle of operation in a way positively meeting the rigid demands set forth above, particularly in connection with aircraft service, and which will permit the manufacture of indicators at a commercially competitive cost.

The accompanying drawings illustrate the principles and operation of the present invention in the form of an indicator adapted to be screwed in the appropriate opening formed for this purpose in a military-type hydraulic line filter of an aircraft hydraulic control system. In these drawings the figures are as follows:

FIG. 1 is a longitudinal section through the indicator showing the parts in non-signaling positions;

FIG. 2 corresponds to FIG. 1 but shows the parts in signaling positions;

FIG. 3 is a cross section taken on the line 3—3 in FIG. 1;

FIG. 4 is a fragmentary view showing a modification wherein the signal is locked against inadvertent actuation due to cold, and therefore highly viscous, hydraulic liquid; and FIG. 5 corresponds to FIG. 4 excepting that it shows the parts in unlocked condition.

Referring now to these drawings, this indicator embodying the invention includes a hollow screw-threaded plug or casing 1 having a high pressure port 2 and a low pressure port 3 located so that when the plug is screwed into the screw-threaded opening of the described kind of filter, it is ready for operation. That is to say, the high pressure port 2 connects with the liquid on the upstream side of the filtering element of the filter and the low pressure port 3 connects with the fluid on the downstream side of the filtering element.

This plug or casing internally forms a cylinder 4 containing the reciprocative pressure differential measuring piston 5, and a cylinder 6 containing a reciprocative signal button 7. The two cylinders are separated by a permanent and fluid-tight wall 8 formed as an integral part of the plug 1. When screwed into the filter opening tightly, the indicator because of this wall 8 positively confines the hydraulic liquid, there being no dynamic seals of any kind which might introduce a leakage problem.

A spring 9 in the form of a helical compression spring is located inside the cylinder 4 and biases the piston 5 towards the high pressure port 2. The elastic force exerted by this spring and the piston area relationship between the piston's opposite sides, determine the pressure differential required to move the piston 5. As described hereinafter, this relationship changes during the operation of this indicator. The problem in any event is to use the movement of this piston 5 to operate the button 7, or other signal device, located on the opposite side of the wall 8 which is required for absolute fluid tightness.

According to the present invention, the piston 5 is connected to a permanent magnet 10, and the button 7 is connected to a permanent magnet 11. A difference over known prior art arrangements is that these magnets are arranged to form similar poles at their mutually adjacent ends. In other words, the magnets are arranged so that the polarity of the ends of the two magnets most adjacent to each other are the same. That is to say, the arrangement is such that the north pole of one magnet is towards the north pole of the other, or that the south pole of one magnet is towards the south pole of the other. Therefore, when the piston 5 is displaced towards the wall 8 by an excessive fluid pressure differential, the north pole, for example, of the piston's magnet repulses the button's magnet 11 so as to move the button 7 to its signaling position.

The above arrangement has the advantage that the overall design of the indicator can be made very simple with the high pressure port 2 in the end of the plug as shown in the drawings, and the low pressure port 3 may be made in the form of a short bore extending diagonally through the plug inside of the latter's installing screw threads 12. The necessary biasing spring 9 may be and is located directly between the wall 8 and the piston 5.

The high pressure port 2 is formed in an end cap 13 attached to the end of the plug to close the cylinder 4 and hold the piston 5 against ejection from its intended range of movement by the spring 9. In addition, this end cap has a conical portion on its inside which forms a valve seat 14 around the port 2. The adjacent end of the piston 5 is contoured to form a valve head 15 normally closing the port 2 and, when closed, to present a piston area to the high pressure fluid that is much smaller than that of the entire piston area. In other words, the effective piston area presented by the piston 5 to the fluid, once the piston 5 is moved to open the port 2, is much greater than the piston area presented to the high pressure fluid while this port is closed. This smaller piston area is substantially that of the cross-sectional area of the port 2 excepting for the slight enlargement of this area resulting from the shallow bore formation shown to permit the piston 5 to function as a valve head for the seat 14 by slightly overlapping the bore which this seat surrounds.

In operation, once the pressure differential increases to a point where the elastic bias provided by the spring 9 is less than the force exerted by the liquid against the relatively smaller piston area provided by the valve head 15 of the piston, the piston moves slightly so that the liquid has immediate access to the overall and much greater piston area of the entire piston 5. The latter then moves rapidly or literally slams against the opposite extreme of its movement where the magnet 10 repulses the magnet 11. The magnet 10 is of slightly smaller diameter than the piston 5 and the latter has a bore 16 in which this magnet is retained. The magnet 11, of course, drives the button 7 rapidly and positively to its signaling position.

Two things prevent inadvertent actuation of the signal button 7.

One is a coil spring 17. It can be seen that the indicator button 7 is made in the form of a hollow shell forming a pocket in which the magnet 11 is retained, and forming a flange 18 on which the inner end of the spring 17 sits, the outer end of this spring being held by a retainer cap 19 fixed to the outer end of the plug or shell or casing 1 and having a hole 20 through which the button 7 can extend so as to be easily visible or felt. This spring 17 should not be so strong as to prevent the magnetic repulsion force from driving the button to its signaling position when the piston 5 is displaced and this action is required. As shown, the plug 1 is formed with an enlarged outer cylinder and fitted with a bushing 21 internally bored to form a sliding fit with the flange 18 of the button 7, the latter being otherwise free from this bore excepting for its passage through the hole 20. In this way frictional restraint of the movement of the button 7 is kept at a minimum.

The other means for preventing inadvertent actuation of the indicator button 7 is a plate or disk 22 of magnetic material located on the outside of the wall 8. This disk is preferably made from material that does not permanently magnetize and it is located in a depression 23 formed in the bottom of the bore of the plug that receives the bushing 21. This disk is relatively thin and it is permanently mounted relative to the plug or shell 1 and the wall 8 formed thereby.

The cap 19 is made of magnetic material and may be permanently magnetized, if desired, providing it presents opposite polarity to the magnet 11. When this magnet 11 is repulsed by the magnet 10, the magnet 11 is attracted to this end cap and held positively with the button 7 in its signaling position. Adequate pressure on the button causes disengagement, the spring 17 and disk 22 causing the button to snap to its non-signaling position.

In operation, the button 7 is held in non-indicating position not only by the spring 17, which can, of course, not be made to exert excessive button positioning force, but also by the magnetic attraction of the magnet 11 to this disk 22. Assuming the disk to be made of magnetic material that does not permanently magnetize it, of course, acquires the same polarity as the magnet 11 when the latter is located against this disk. As soon as the magnet 10 of the pressure differential piston moves against the other side of the wall 8, the polarity of this disk 22 is quickly or substantially immediately reversed and the button's magnet 11 is driven outwardly to be secured firmly by its attraction to the magnetic cap 19.

To assure proper action, the magnetic material disk 22 is not only thin but is made with the same diameter or cross-sectional area and contour as that of the magnet 11.

As previously indicated, the peripheral edge of the piston 5 projects radially from its magnet 10. This edge forms a valve head 5a which seats on a valve seat 1a formed by the plug 1 because the latter is counter-bored to pass the magnet 10. This positively seals off any communication between the ports 2 and 3, which span this seat 1a, when the piston 5 is actuated. This makes it unnecessary for the piston 5 to fit its cylinder 4 fluid-tightly, keeping in mind that when inactive the piston 5 seals off the port 2 because it acts as a valve head seating against the valve seat 14. This advantage eliminates the need for precision fitting, miniature piston rings or the like to obtain fluid tightness between the piston 5 and its cylinder 4.

In connection with the above, the port 3 should be made to provide a reverse flow rate, required for actuation of the piston 5, which is greater than the flow rate of any leakage between the piston 5 and its cylinder 4. This is because if the flow rate between the piston 5 and its cylinder 4 equals or exceeds this reverse flow rate through the port 3, the piston 5 can not move properly towards the wall 8 as required for actuation of the signal button.

As is well known, when liquid is cold it is more viscous than when it is hot, and when filtered while cold an excessive pressure differential exists between the upstream and downstream sides of a filtering element, even when the element is in perfect condition. The use of a thermostatic element to prevent operation of a device before it reaches a desired operating temperature is, of course, of great antiquity. The construction of the illustrated indicator permits easy installation of such a thermal lock-out device as is shown by FIGS. 3–5.

FIG. 3 shows how the button's bushing 21 may be longitudinally recessed at diametrically opposite points, as at 24, with these recesses serving to receive bimetallic thermostatic strips 25. The use of this bushing is an advantage because the other parts may be used whether or not a thermal lock-out is desired. Only this bushing is different.

These strips 25 are locked to the bushing 21 at their outer ends and under cold conditions deflect inwardly as shown by FIG. 4, to positively lock against the button's flange 18. When the filter handling the hydraulic liquid warms up, the bimetallic strips 25 flatten, as shown by FIG. 5, so as to move away from the button's flange 18 and, therefore, unlock the button.

The material from which the plug or case 1 is made should, of course, be sufficiently nonmagnetic to avoid interference with the magnetic action described hereinabove. Most noncorrosive metals are nonmagnetic and can be used. These statements apply equally to the other parts which, if magnetic, would act as magnetic flux paths between the opposite ends of the magnets or otherwise interfere with the magnetic operation.

Obviously, the magnets 10 and 11 should preferably be made of material that will permanently retain the maximum amount of magnetism possible, but ordinary permanent magnetic materials may be used. Both of the magnets are cylindrical.

What is claimed is:

1. A fluid pressure differential indicator comprising a casing forming two axially aligned cylinders separated by a wall, a reciprocative piston in one of said cylinders, means for conducting fluid to said one cylinder on opposite sides of said piston, the latter including a magnet on its side facing said wall, a reciprocative signal element in the other cylinder and including a magnet on its side facing said wall, said magnets presenting similar poles toward each other, and means for biasing said piston towards one of its reciprocative limits, the motion of said piston being transmitted to said signal element by magnet repulsion between said magnets, said higher pressure fluid conducting means having a port in the end of said piston's cylinder remote from said wall, said piston forming a valve head normally closing said port and presenting to said higher pressure fluid a piston area smaller than that of the entire piston end, said piston having means for biasing it towards said port and said piston opening said port when said higher fluid pressure overcomes the bias of the piston's biasing means and thereby exposes its entire piston area to the fluid pressure.

2. An indicator responsive to a predetermined condition comprising a casing forming two axially aligned passages separated by a wall, a magnet mounted for reciprocating movement in one of said passages, means for biasing said magnet away from said wall, means responsive to the occurrence of a predetermined condition for applying force to said magnet in a direction toward said wall and of sufficient magnitude to overcome said biasing means, the other of said axially aligned passages having an opening in the end portion thereof opposite said wall, a signal element mounted for reciprocating movement in said other passage and including another magnet facing said wall, additional means for biasing said signal element toward said wall, said magnet and said additional magnet presenting similar poles toward each other, the motion of said magnet toward said wall in response to force applied to said magnet by said force applying means upon the occurrence of said predetermined condition being transmitted to said signal element by magnetic repulsion between said magnet and said additional magnet and urging said reciprocative signal element to adjacent said opening in said other passage, and a member of magnetic material disposed adjacent said opening of said other passage for latching said other magnet of said reciprocative signal element adjacent said opening when said reciprocative signal element is urged adjacent thereto.

3. An indicator in accordance with claim 2 in which said wall separating said two axially aligned passages has at least a portion thereof formed of magnetic material, said wall being adapted to latch said additional magnet of said reciprocative signal element adjacent thereto until said additional magnet is repulsed by said magnet when said magnet is urged adjacent said wall by said force applying means in response to the occurrence of the predetermined condition.

References Cited

UNITED STATES PATENTS

| | | | |
|---|---|---|---|
| 1,879,381 | 9/1932 | Margiloff | 73—363.5 |
| 2,609,660 | 9/1952 | Eddy. | |
| 2,719,485 | 10/1955 | Bender. | |
| 3,077,854 | 2/1963 | Pall | 116—70 |
| 3,128,743 | 4/1964 | Whiting | 116—70 |
| 3,140,690 | 7/1964 | Siebel | 116—70 |
| 3,212,471 | 10/1965 | Willis | 116—70 |

LOUIS J. CAPOZI, *Primary Examiner.*